United States Patent Office 2,697,699
Patented Dec. 21, 1954

2,697,699

RUBBER COMPOSITION REINFORCED WITH A CLAY WHICH CONTAINS OLEFINICALLY UNSATURATED CATIONS

Morris I. Cohn, Chicago, Ill., assignor to Elastic Colloid Research Corporation, Avon, Mass., a corporation of Delaware No Drawing. Application April 26, 1951,
Serial No. 223,170

5 Claims. (Cl. 260—41.5)

This invention relates to the compounding of rubber and more particularly to a novel reinforced rubber composition.

After the discovery of the vulcanization of rubber, experimenters began to add fillers to rubber compositions as diluents to reduce the volume of rubber in the vulcanized product and thus provide an economy in raw material cost. It was noticed that the fillers, in addition to their value as diluents, modify certain properties of the rubber. These materials have such a pronounced effect upon the characteristics of the rubber that the term "filler" is somewhat misleading in denoting an inert or passive role played by the filler, and the term "reinforcing filler" has been widely adopted to designate materials which in addition to acting as a diluent have pronounced effects on the physical properties of the vulcanizate, particularly the tear and abrasion resistance, stiffness or plasticity, heat softening properties, flexing fatigue, and tensile strength.

Because of the large number of uses which is now made of rubber compositions, the most important characteristics for the different uses vary widely. For example, in heels and rubber tires, abrasion resistance is of primary importance; in cable insulating compounds, the di-electric properties of the rubber are of extreme importance, and in other uses, the properties such as flexing fatigue, tensile strength and heat softening are of primary importance. Obviously the selection of the proper reinforcing filler will depend upon the use to which the rubber composition is to be put.

The most widely used of the reinforcing fillers is carbon black. The recent improvements in the carbon blacks and methods of manufacturing them have provided carbon blacks suitable for use in rubber compositions having widely varying properties. However, the strong covering power of carbon black overcomes any dyes or pigments which may be added to the composition and prevents the production of suitable colored rubber compositions.

The mechanism by which the usual reinforcing fillers affect the properties of rubber compounds is not thoroughly known, but it is believed that the rubber molecules are adsorbed on the surface of the filler. For this reason, it is desirable to provide a finely divided filler in order to present the largest possible surface for contact with the rubber molecules. The adsorptive forces between the rubber and the surface of the filler are weak as compared with primary valence forces which would exist if the filler could enter directly into the bridging reactions which take place during the vulcanization of the rubber.

It is further desirable to provide a filler having a surface which is easily wetted by the rubber to allow rapid mixing and intimate contact between the rubber molecules and the filler. Such a filler might be one having a chemical composition on its surface compatible with the rubber, and is herein described as being organophilic.

It is an object of this invention to provide a rubber composition in which the filler is bound to the rubber particles during vulcanization by bridging between the filler and the rubber.

Another object is to provide a rubber composition including a reactive organophilic clay filler.

A further object is to provide a rubber composition in which rubber is compounded with a reinforcing filler forming strong forces between the rubber and the filler and having a light color to permit the production of a wide variety of colored rubber products.

It is also an object of this invention to provide a rubber composition filled with clay having an organic cation capable of entering into the vulcanization reaction adhering to its surface.

Still another object of this invention is to provide a rubber composition including a filler of clay to which an olefinic cation has been added to the surface by ion exchange.

With these and other objects in view, as will become apparent from the following detailed description, this invention resides in a rubber composition reinforced with a clay having an organophilic surface capable of entering into the vulcanization reaction.

In general, the improved rubber compositions of this invention are produced by compounding rubber in the conventional manner with the usual accelerators, accelerator activators and other modifying materials in conventional rubber milling and compounding apparatus and procedures with an activated clay filler. The clay filler has had its surface modified and rendered chemically unsaturated and organophilic by ion or base exchange reactions in which unsaturated olefinic cations replace metallic, more easily hydrated, cations in the clay. The olefinic cations are capable of entering directly into the vulcanization reaction and binding the rubber molecules to the filler by primary valence forces rather than the relatively weak adsorptive forces.

The "clays" employed in this invention are any inorganic minerals having the ability to ionically or electrostatically bind reactive cations. A preferred clay for use in this invention, because of its high ion exchange capacity, is bentonite. Other clays, such as kaolin, of a non-montmorillonite type, and normally having weak ion exchange properties may also be employed, but it is preferred that those clays be activated by grinding or other processes prior to the ion exchange reaction. "Synthetic clays" such as the hydrated calcium silicates known in the trade as "Silene E F" prepared by the Pittsburgh Plate Glass Company, as well as certain hydrated silicas, also can be employed in this invention. The essential characteristic of the filler is that it be capable of having a reactive unsaturated organic cation bound on its surface.

Ordinarily, it is desirable to grind the clays to a very small particle size for incorporation in the final rubber composition. The grinding of the clays improves its base exchange properties by exposing a large surface to the organic cations and by fracture of the crystal lattices of the clay to produce unsatisfied valences improving its base exchange properties. In addition, the fine particles size exposes a greater surface for binding forces with the rubber of the vulcanized product and improves the dispersion of the clay throughout the rubber.

The organic material employed to modify the clay and render it organophilic is one yielding unsaturated cations for base exchange with the clays. The desired ionization is obtained by employing an olefinic compound complexed with an acid. It is preferable that the organic cation be poorly hydrated to drive the base exchange reaction, hereinafter described, more nearly to completion by removing the ion exchanged clay from the reaction system.

Typical materials which may be added to the clay by ion exchange are those having the formula $R_2NH_2X$, $R_3NHX$, $R_4NOH$, and $RNH_3X$ where R is an olefinic radical and X is an acid radical which ionizes readily. The chloride and acetate radicals are preferred acid radicals employed in the preparation of the reactive filler of this invention. The length of the carbon chain in the radical R is in general from about 3 to about 18 carbon atoms, but will depend upon whether the salt of the amines is primary, secondary, tertiary, etc. as well as the length of the carbon chain in each branch of the compound. For example, the treatment of bentonite with primary allyl amine acetate or chloride provides a gel apparently having a surface which is only partially organophilic, whereas diallyl amine acetate or chloride flocculates the clay readily and provides a reactive organophilic filler. The upper limit on the length of the carbon chain is determined by the reactivity desired for the filler. Reactive organophilic fillers have been prepared from salts of $C_{18}$ amines as described in the following example, and can be prepared from a compound of longer carbon chains.

The ion exchange reaction between the clay and the olefinic compound is generally accomplished by vigorous agitation of a slurry of the clay with the olefinic compound. In general, as high a concentration of olefinic compound as possible aids in the ion exchange reaction, and an excess of the olefinic compound tends to drive the ion exchange reaction to completion in accordance with the laws of mass action. It will be appreciated that the tendency of clays such as bentonite to gel when mixed with water and the amount of the olefinic compound lost in the liquid drained from the following treated clay will influence both the concentration of the reactants in the solution and the excess of olefinic compound employed. Following the ion exchange reaction, the clay is washed, filtered and dried.

Specific examples of methods for the preparation of the reactive organophilic clay employed as a reinforcing filler according to this invention are described below. It will be understood that the examples are given merely for purposes of illustration and in no way limit the scope of the applicant's invention. For instance, the time of agitating the clay with the ionized olefinic compound may vary widely. For bentonite, which has a high ion exchange capacity, the reaction appears to be complete within a few minutes; however, with other types of clays the reaction is much slower and may require many hours for completion of the ion exchange.

EXAMPLE 1

A total of 221 grams of bentonite were added to 6 liters of water. To the resulting slurry were added 63 grams of allyl amine and 40.3 grams of hydrochloric acid. The mixture was vigorously agitated for a period of 25 hours. Approximately one-half of the reaction product was centrifuged for twenty minutes, the solids re-pulped in water and filtered to separate the wash water therefrom. The filtered clay was then dried under vacuum at room temperature for a period of about five days. Other methods of drying such as oven drying at a temperature of 120–122° F. and oven drying in a vacuum at a temperature of 120–122° F. for shorter periods also have been used. The resultant product was ground in a ball mill to 325 mesh.

EXAMPLE 2

220 grams of Wyoming bentonite were carefully dispersed in 6 liters of water. To the resulting dispersion 11.3 cc. of allyl amine acetate and 8.65 cc. of acetic acid were added. The resultant mixture was agitated and resulted in the flocculation of the clay, indicating a marked change in the hydration of the surface of the clay. The reaction product was diluted with 2 parts of water to 1 part of product and centrifuged at 24,000 R. P. M. The solids collected in the centrifuge operation were carefully re-pulped in 6 liters of water. The re-pulped material was filtered on a suction filter and the solids dried for 22 hours at 122° F. The dried product was ground in a ball mill to 325 mesh.

EXAMPLE 3

240 grams of bentonite were agitated with a $C_{18}$ amine acetate until a thorough dispersion was obtained. The $C_{18}$ amine has an average of 1 double bond per molecule. The reaction product was centrifuged, the solids re-pulped, filtered, and dried. The dry material was ground to 325 mesh. The $C_{18}$ amine has an average of 1 double bond per molecule as prepared by the chemical division of Armour & Company, Chicago, Illinois, and is given the name "Soyamine," or Armeen S, identifying a mixture of high molecular weight aliphatic amines consisting essentially of the olefinic or unsaturated, oleyl and linoleyl, amines and the saturated, palmityl and stearyl, amines, with the olefinic amines predominating.

The treated clay possesses many of the properties of unsaturated organic compounds. For instance, the clay adds bromine stoichiometrically and is capable of reacting with sulfur in a vulcanization process. Apparently the olefinic cations are exchanged for the hydrated cations originally present in the clay.

The novel rubber composition of this invention is prepared by compounding the reactive organophilic clay with a rubber capable of vulcanization by the addition of sulfur, or other reactants such as selenium, tellurium, peroxide, etc., linkages between points of unsaturation on adjacent molecules. The rubber may be either natural smoked sheet or one of the synthetic rubbers such as GR–S (butadiene-styrene copolymer), GR–N (Hycar: butadiene-acrylonitrile copolymer), polybutadiene, GR–I (isoprene-isobutylene copolymer), etc.

In the compounding the rubber is mixed with accelerators, activators, and antioxidants in the conventional manner and the reactive organophilic clay may be added during the addition of those materials or later during the addition of a vulcanizing agent such as sulfur. One method that has been found satisfactory is to mix the rubber with the desired accelerators, activators and antioxidants in a Banbury mixer to prepare an initial composition which is finally mixed on conventional rubber mills with the reactive clay and a vulcanizing agent. In this manner, accurate control of the volume loading of the rubber with the reactive filler is made possible. In some instances, it is preferable to add the reactive clay filler in the form of an aqueous slurry to the rubber in a Banbury mixer, and allow the heat generated within the chamber to evaporate the water. The organophilic nature of the fillers makes the fillers easily compatible with the rubber and allows rapid mixing and complete wetting of the surface of the filler particles on the rolls.

Examples of typical rubber formulas in which the reactive organophilic fillers may be compounded are set forth below. The filler may be added to such compositions in volume loading ranging upward to as high as 60 or even more cc. of filler per 100 grams of rubber. It will be appreciated that the particular rubber formula and volume loading will depend upon the use which is to be made of the final rubber product, and that the compositions in Table 1 are merely for purposes of illustration.

Table 1.—Rubber formulas

| Ingredient | Function | Parts by Weight |
|---|---|---|
| Formula 101: | | |
| Smoked Sheet | | 100 |
| Stearic Acid | Plasticizer and Activator | 3.0 |
| Zinc Oxide | Activator | 5.0 |
| MBTS (Mercaptobenzothiazyl Disulfide) | Accelerator | 1.0 |
| TMTDS (Tetramethylthiuram Disulfide) | do | 0.25 |
| PBNA (Phenyl-beta-naphthyl-amine) | Antioxidant | 1.0 |
| Sulfur | Vulcanizing Agent | 3.0 |
| Filler | Reinforcing Agent | |
| Formula 201: | | |
| Smoked sheet | | 100 |
| Stearic Acid | Plasticizer and Activator | 2.5 |
| Zinc Oxide | Activator | 3.0 |
| MBTS (Mercapto-benzothiazyl Disulfide) | Accelerator | 1.0 |
| Agerite White (Sym. Di-beta-napathyl-para-phenylenediamine) | Antioxidant | 1.0 |
| Sulfur | Vulcanizing Agent | 2.5 |
| Filler | Reinforcing Agent | |
| Formula 301: | | |
| GR–S–50 or X478 | | 100 |
| Cumar Resin MH 2½ | Plasticizer | 5.0 |
| (Stearic acid) | (Activator for GR-S-X478) | (3.0) |
| Zinc Oxide | Activator | 3.0 |
| Light Magnesium Oxide | Retarder | 3.0 |
| MBT (Mercapto-benzothiazole) | Accelerator | 1.0 |
| DOTG (Di-ortho-tolyl Guanidine) | do | 0.15 |
| Sulfur | Vulcanizing Agent | 3.0 |
| Filler | Reinforcing Agent | |

The vulcanization of the novel rubber composition of this invention is performed according to conventional vulcanization techniques. In the preparation of test specimens, rubber stocks were vulcanized by heating in molds under a pressure of about 600 pounds per square inch gauge at a temperature of about 290° for periods ranging from five to 120 minutes.

It is believed that the presence of the olefinic radicals on the surface of the clay allows direct reaction between the filler and the vulcanizing agent to join the particles of the filler with the rubber molecules by primary valence bonds. This is in contrast with the fillers heretofore available, in which the bonds between the filler and the rubber were believed to rely on the much weaker secondary or adsorptive forces. It will be appreciated in view of the wide variety of uses made of rubber products that no single property of the rubber will furnish an accurate measure of the value of the rubber product for all uses.

As an illustration of the effect of the reactive organophilic fillers of this invention, a comparison of the filler of this invention with untreated bentonite when used with synthetic rubber GR–S–50 is set forth in Table 2.

*Table 2.—Tensile properties imparted to GR–S–50[1] by 30 volume loadings of unsaturated organophilic bentonites*

| Rubber | Clay Used | Unsaturation (m. eq./gm. of clay) | Optimum[2] Cure (min.) | Modulus at 300% E (p. s. i.) | Tensile Strength (p. s. i.) | Resilient[3] Energy (in.-lbs./in.) |
|---|---|---|---|---|---|---|
| GR-S-50 | Pure Gum | | 20 | | 280 | 333 |
| GR-S-50 | Untreated Bentonite | | 30 | 75 | 325 | 1,000 |
| GR-S-50 | Bentonite Activated with $C_{18}$ Amine. | 1.28–1.62 | 30 | 450 | 920 | 1,990 |

[1] A copolymer of butadiene and styrene in which approximately 23.5% of the hydrocarbon present is derived from styrene and to which approximately 1.25% of stalite antioxidant has been added.
[2] The length of cure giving highest ultimate tensile strength.
[3] Area under the stress strain curve.

The novel composition of this invention is unique in that the filler is not merely a diluent nor are the forces of attraction between the filler and the rubber molecules merely the result of adhesive forces. The unsaturated cations which have been introduced into the clay are capable of entering directly into the vulcanization reaction whereby the filler may be chemically bound to the rubber.

I claim:
1. A composition of matter comprising a vulcanizable, ethylenically unsaturated, rubbery material and a modified clay filler having the inorganic cations thereof replaced by substituted organic olefinic cations selected from the group consisting of $R_2NH_2^+$, $R_3NH^+$, $R_4N^+$, and $RNH_3^+$, where R is an olefinically unsaturated radical having from 3 to 18 carbon atoms.
2. A composition of matter comprising a vulcanizable, ethylenically unsaturated, rubbery material and a modified clay filler having the inorganic cations thereof replaced by substituted organic olefinic cations selected from the group consisting of $R_2NH_2^+$, $R_3NH^+$, $R_4N^+$, and $RNH_3^+$, where R is an olefinically unsaturated radical having from 3 to 18 carbon atoms, said modified clay filler being adapted for chemical combination with the rubber material during vulcanization thereof.
3. A composition as defined in claim 2, in which the modified clay is a hydrated silica containing reactive cations derived from diallyl amine acetate.
4. A process of preparing a reinforced rubber-like composition which comprises dispersing in a vulcanizable, ethylenically unsaturated rubbery material a modified clay filler in which the inorganic cations have been replaced by substituted organic olefinic cations selected from the group consisting of $RNH_3^+$, $R_2NH_2^+$, $R_3NH^+$, and $R_4N^+$, where R is an olefinically unsaturated radical having from 3 to 18 carbon atoms, and a vulcanizing agent, and vulcanizing the milled mixture to combine chemically the rubbery material and the modified clay filler.
5. A process as defined in claim 4 in which the modified filler is a hydrated silica containing reactive cations derived from allyl amine acetate.

References Cited in the file of this patent

UNITED STATES PATENTS

| Number | Name | Date |
|---|---|---|
| 2,531,396 | Carter | Nov. 28, 1951 |
| 2,578,605 | Sears | Dec. 11, 1951 |